(12) United States Patent
Bohner et al.

(10) Patent No.: US 6,716,937 B2
(45) Date of Patent: Apr. 6, 2004

(54) METHOD FOR THE SINGLE-STEP PRODUCTION OF POLYTETRAHYDROFURAN AND TETRAHYDROFURAN COPOLYMERS

(75) Inventors: Gerd Bohner, Malsch (DE); Thomas Domschke, Speyer (DE); Rolf-Hartmuth Fischer, Heidelberg (DE); Martin Haubner, Limburgerhof (DE); Christoph Sigwart, Schriesheim (DE); Ulrich Steinbrenner, Neustadt (DE); Christian Tragut, Wachenheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/312,851
(22) PCT Filed: Jun. 29, 2001
(86) PCT No.: PCT/EP01/07427
§ 371 (c)(1), (2), (4) Date: Jan. 2, 2003
(87) PCT Pub. No.: WO02/02669
PCT Pub. Date: Jan. 10, 2002

(65) Prior Publication Data
US 2003/0176630 A1 Sep. 18, 2003

(30) Foreign Application Priority Data
Jul. 3, 2000 (DE) .......................... 100 32 266

(51) Int. Cl.⁷ .......................... C08F 2/44; C07D 315/00
(52) U.S. Cl. .......................... 526/68; 549/472
(58) Field of Search .......................... 562/68; 549/472

(56) References Cited
U.S. PATENT DOCUMENTS

| 4,120,903 A | 10/1978 | Pruckmayr et al. |
|---|---|---|
| 4,500,705 A | 2/1985 | Copelin |
| 4,933,503 A | 6/1990 | Mueller |
| 5,149,862 A | 9/1992 | Dorai et al. |
| 5,756,604 A | 5/1998 | Nakaoka et al. |
| 5,773,648 A | 6/1998 | Becker et al. |
| 6,211,401 B1 | 4/2001 | Eller et al. |

FOREIGN PATENT DOCUMENTS

| DE | 44 33 606 | 3/1996 |
|---|---|---|
| DE | 196 49803 | 7/1998 |
| EP | 126 471 | 11/1984 |
| EP | 305 853 | 3/1989 |
| WO | 93/18083 | 9/1993 |
| WO | 99/12992 | 3/1999 |

*Primary Examiner*—Taofiq Solola
(74) *Attorney, Agent, or Firm*—Keil & Weinkauf

(57) ABSTRACT

A process for the single-stage preparation of polytetrahydrofuran and/or tetrahydrofuran copolymers having a mean molecular weight of from 650 to 5000 dalton by polymerization of tetrahydrofuran over a heterogeneous acid catalyst in the presence of at least one telogen and/or comonomer selected from the group consisting of alpha,omega-diols, water, polytetrahydrofuran having a molecular weight of from 200 to 700 dalton and cyclic ethers comprises a) separating off the catalyst and/or downstream products of the catalyst suspended and/or dissolved in the output from the polymerization, b) fractionating the resulting catalyst-free output from the polymerization in at least one distillation step to give a distillation residue comprising the polymerization product and at least one tetrahydrofuran fraction and returning at least part of the tetrahydrofuran fraction to the polymerization and c) separating low molecular weight polytetrahydrofuran and/or tetrahydrofuran copolymers having a mean molecular weight of from 200 to 700 dalton from the distillation residue from work-up step b) and isolating polytetrahydrofuran and/or tetrahydrofuran copolymers having a mean molecular weight of from 650 to 5000 dalton.

7 Claims, 1 Drawing Sheet

METHOD FOR THE SINGLE-STEP PRODUCTION OF POLYTETRAHYDROFURAN AND TETRAHYDROFURAN COPOLYMERS

This application is a 371 of PCT/EP01/07427 filed Jun. 29, 2001.

FIELD OF INVENTION

The present invention relates to a process for preparing polytetrahydrofuran or tetrahydrofuran copolymers by polymerization of tetrahydrofuran over a heterogeneous, acid catalyst in the presence of at least one telogen and/or comonomer selected from the group consisting of alpha, omega-diols, water, polytetrahydrofuran having a mean molecular weight of from 200 to 700 dalton and cyclic ethers with at least part of the unreacted tetrahydrofuran being returned to the polymerization.

BACKGROUND OF THE INVENTION

Polytetrahydrofuran, hereinafter referred to as PTHF, which is also known as polyoxybutylene glycol is used as a versatile intermediate in the plastics and synthetic fibers industry and is employed, inter alia, for preparing polyurethane, polyester and polyamide elastomers. Furthermore, it, like some of its derivatives, is a valuable auxiliary in many areas, for example as dispersant or in the deinking of waste paper.

PTHF is usually prepared industrially by polymerization of tetrahydrofuran, hereinafter referred to as THF for short, over suitable catalysts. Addition of suitable reagents makes it possible to control the chain length of the polymer chains and thus to set the mean molecular weight to the desired value. Such reagents are termed chain termination reagents or "telogens". This control is achieved by choice of type and amount of the telogen. Additional functional groups can be introduced at one or both ends of the polymer chain by choice of suitable telogens.

Thus, for example, use of carboxylic acids or carboxylic anhydrides as telogens makes it possible to produce the monoesters or diesters of PTHF, which subsequently have to be converted in to PTHF by saponification or transesterification. These processes are therefore known as two-stage PTHF processes.

Other telogens act not only as chain termination reagents but are also incorporated into the growing polymer chain of the PTHF. They not only have the function of a telogen, but at the same time act as a comonomer and can therefore be equally well designated as telogens and as comonomers. Examples of such comonomers are telogens having two hydroxy groups, e.g. diols (dialcohols). These can be, for example, ethylene glycol, propylene glycol, butylene glycol, 1,3-propanediol, 1,4-butanediol, 2-butyne-1,4-diol, 1,6-hexanediol or low molecular weight PTHF. Further suitable comonomers are cyclic ethers such as 1,2-alkylene oxides, for example ethylene oxide or propylene oxide, 2-methyltetrahydrofuran or 3-methyltetrahydrofuran. With the exception of water, 1,4-butanediol and low molecular weight PTHF, the use of such comonomers leads to the preparation of tetrahydrofuran copolymers, hereinafter referred to as THF copolymers, and in this way makes it possible to modify PTHF chemically.

In industry, use is made predominantly of two-stage processes in which tetrahydrofuran is, for example, polymerized in the presence of fluorosulfonic acid to form polytetrahydrofuran esters which are subsequently hydrolyzed to polytetrahydrofuran. Alternatively, tetrahydrofuran is, for example, polymerized with acetic anhydride in the presence of acid catalysts to form polytetrahydrofuran diacetate which is subsequently transesterified, for example with methanol, to give polytetrahydrofuran. Disadvantages of such processes are that they have to be carried out in two stages and that by-products such as hydrofluoric acid and methyl acetate are formed.

The single-stage synthesis of PTHF is carried out by polymerization of THF using water, 1,4-butanediol or low molecular weight PTHF as telogen over acid catalysts. Known catalysts are both systems homogeneously dissolved in the reaction system and also heterogeneous, i.e. largely undissolved, systems.

EP-B-126 471 describes water-containing heteropolyacids, for example tungstophosphoric acid, for the single-stage synthesis of PTHF using water as telogen, and EP-B-158 229 discloses the same catalyts for the single-stage synthesis of PTHF using diols such as 1,4-butanediol as telogen. Under the reaction conditions described, two liquid phases, namely one catalyst-containing phase in which not only THF but also the major part of the heteropolyacid and the water are present and an organic phase comprising mainly THF, PTHF and residual amounts of catalyst, are formed. Since it is difficult to separate off the homogeneous catalyst, the heterogeneously catalyzed processes have gained importance for the single-stage synthesis of PTHF and also the direct synthesis of THF copolymers.

According to U.S. Pat. No. 4,120,903, PTHF can be prepared from THF and water with the aid of superacid Nafion® ion exchange resins.

DE-A 44 33 606 describes, inter alia, a process for preparing PTHF by polymerization of tetrahydrofuran over a heterogeneous catalyst in the presence of one of the telogens water, 1,4-butanediol, PTHF having a molecular weight of from 200 to 700 dalton or mixtures of these telogens, where the catalyst is a supported catalyst which comprises a catalytically active amount of an oxygen-containing tungsten or molybdenum compound or mixtures of these compounds on an oxidic support material and has been calcined at from 500° C. to 1000° C. after application of the precursor compounds of the oxygen-containing molybdenum and/or tungsten compounds. DE-A 196 49 803 discloses the use of promoters to increase the activity of the catalysts described in DE-A 44 33 606.

U.S. Pat. No. 5,149,862 describes sulfate-doped zirconium dioxide as heterogeneous acid catalyst for the polymerization of tetrahydrofuran.

Commercial polytetrahydrofuran and THF copolymer products have to have a specified mean molecular weight, usually in the range from 650 to 5000 dalton, and a narrow molecular weight distribution. At the same time, their color numbers must not exceed particular limiting values. Thus, the color number has to be below 40 APHA, preferably below 20 APHA.

A disadvantage of the known homogeneously or heterogeneously catalyzed processes for the single-stage synthesis of PTHF or THF copolymers is that they do not allow all the abovementioned properties of the PTHF and/or the THF copolymers necessary for commercial products to be realized simultaneously. Thus, numerous after-treatment processes for purification and reduction in the color number of the PTHF and/or the THF copolymers are known. In these, the products obtained from the polymerization, for example as described in EP-A 424 791, are after-treated with hydrogen in the presence of a hydrogenation catalyst.

BRIEF SUMMARY OF THE INVENTION

It is an object of the present invention to find an economical, single-stage process which makes it possible to obtain both PTHF and THF copolymers having a narrow molecular weight distribution and a low color number in high space-time yield and with high selectivity.

We have found that this object is achieved by a process for the single-stage preparation of polytetrahydrofuran (PTHF) and/or tetrahydrofuran copolymers (THF copolymers) by polymerization of tetrahydrofuran over a heterogeneous acid catalyst in the presence of at least one telogen and/or comonomer selected from the group consisting of alpha, omega-diols, water, polytetrahydrofuran having a molecular weight of from 200 to 700 dalton and cyclic ethers, which comprises a) separating off the catalyst and/or downstream products of the catalyst suspended and/or dissolved in the output from the polymerization, b) fractionating the resulting catalyst-free output from the polymerization in at least one distillation step to give a distillation residue comprising the polymerization product and at least one tetrahydrofuran fraction and returning at least part of the tetrahydrofuran fraction to the polymerization and c) separating low molecular weight polytetrahydrofuran or tetrahydrofuran copolymers having a mean molecular weight of from 200 to 700 dalton from the distillation residue from work-up step b) and isolating PTHF and/or THF copolymers having a mean molecular weight of from 650 to 5000 dalton.

DETAILED DESCRIPTION OF THE INVENTION

Figure 1:
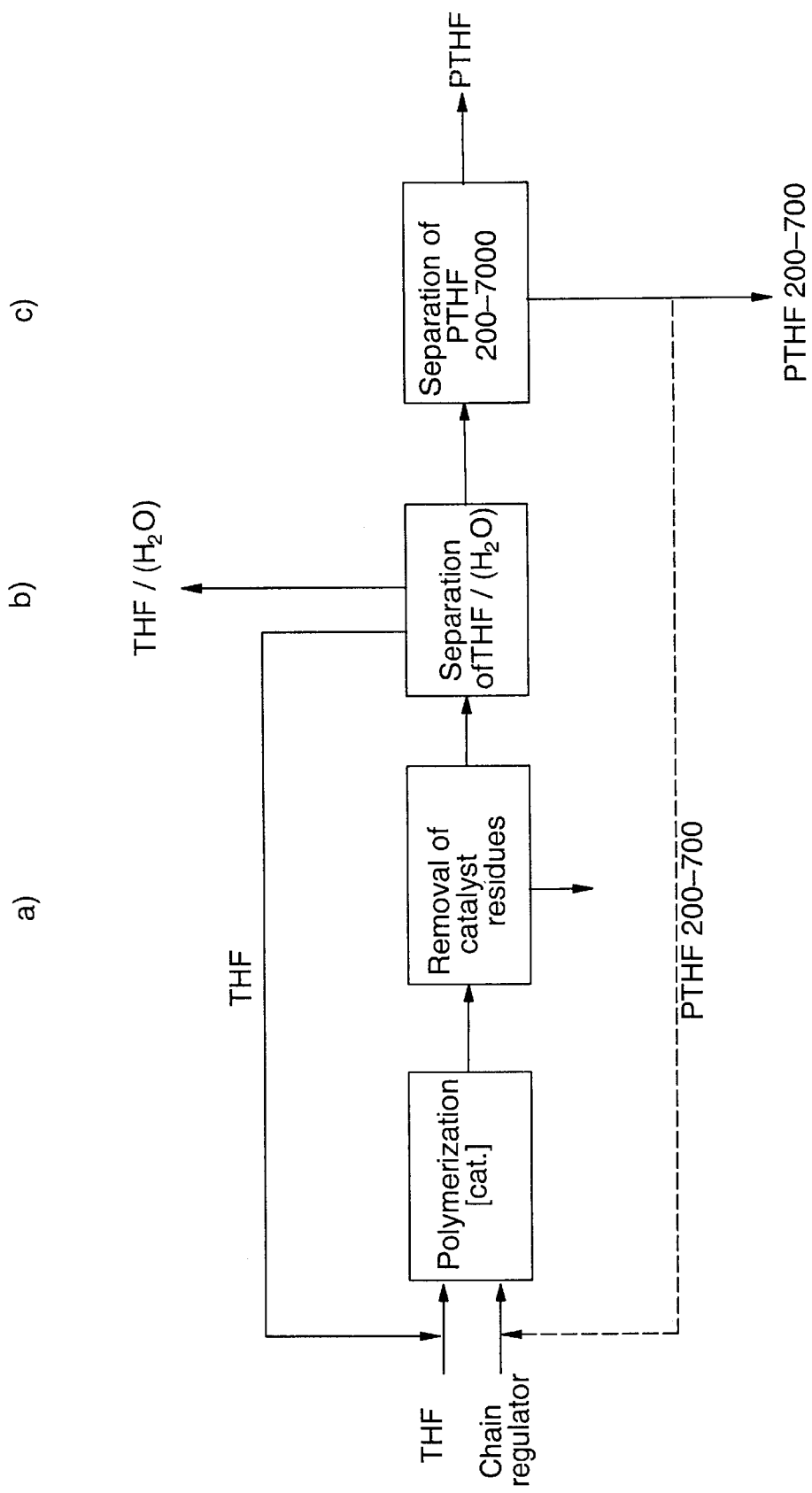
FIG. 1 shows a diagrammatic flow of the single stage process.

The process of the present invention for the single-stage synthesis of PTHF and THF copolymers makes it possible to obtain, without a separate after-treatment process, both PTHF and THF copolymers having a narrow molecular weight distribution and a low color number in a high space-time yield and with high selectivity. The recycling of the tetrahydrofuran which has been separated off contributes to the favorable economics of the process of the present invention.

According to the present invention, a polymerization product is firstly prepared by cationic polymerization of tetrahydrofuran over a heterogeneous acid catalyst in the presence of at least one telogen and/or comonomer selected from the group consisting of alpha,omega-diols, water, polytetrahydrofuran having a molecular weight of from 200 to 700 dalton and cyclic ethers.

Polymerization catalysts used are preferably heterogeneous acid catalysts which contain acid centers having an acid strength $H_0$ of <+2 in a concentration of at least 0.005 mmol/g of catalyst, particularly preferably centers having an acid strength $H_0$ of <+1.5 in a concentration of at least 0.01 mmol/g of catalyst.

Examples of polymerization catalyts which can be used in the process of the present invention are sulfate-doped zirconium dioxide, sheet silicates or zeolites which may, if desired, have been activated by acid treatment, polymers comprising alpha-fluorosulfonic acids, supported catalysts comprising an oxidic support material to which a catalytically active amount of a tungsten or molybdenum compound or a mixture of such compounds has been applied, with preference being given to supported catalysts comprising an oxidic support material to which a catalytically active amount of a tungsten or molybdenum compound or a mixture of such compounds has been applied.

Sulfate-doped zirconium dioxide which is suitable for the process of the present invention can be prepared, for example, by the method described in U.S. Pat. No. 5,149,862.

Apart from sulfate-doped zirconium dioxide, it is also possible to use polymers comprising alpha-fluorosulfonic acids as polymerization catalyst. Preference is given to perfluorinated polymers comprising alpha-fluorosulfonic acids which are, for example, sold as commercial products under the name Nafion® by E.I. du Pont de Nemours and Company.

Suitable supported catalysts which comprise an oxidic support material to which oxygen-containing molybdenum or tungsten compounds or mixtures of such compounds have been applied as catalytically active compounds and which may additionally be doped with sulfate or phosphate groups are described in DE-A 44 33 606, which is hereby expressly incorporated by reference. These catalysts can be pretreated with a reducing agent, preferably hydrogen, as described in DE 196 41 481, which is hereby expressly incorporated by reference.

Further suitable catalysts are the supported catalysts described in the German patent application DE 196 49 803, which is hereby expressly incorporated by reference, which comprise, as active composition, a catalytically active amount of at least one oxygen-containing molybdenum and/or tungsten compound and which have been calcined at from 500° C. to 1000° C. after application of the precursor compounds of the active composition to the support material precursor, which catalysts further comprise a promoter comprising at least one element or compound of an element of groups 2, 3 including the lanthanides, 5, 6, 7, 8 and 14 of the Periodic Table of the Elements. These catalysts generally contain from 0.01 to 30% by weight, preferably from 0.05 to 20% by weight and particularly preferably from 0.1 to 15% by weight, of promoter, calculated as sum of its constituents in the form of their elements and based on the total weight of the catalyst.

The catalysts which are known from DE-A 44 33 606 and DE 196 49 803 and which can be employed according to the present invention generally contain from 0.1 to 50% by weight of the catalytically active, oxygen-containing compounds of molybdenum or tungsten or of mixtures of catalytically active, oxygen-containing compounds of these metals, in each case based on the total weight of the catalyst and, since the chemical structure of the catalytically active, oxygen-containing compounds of molybdenum and/or tungsten is not yet known precisely, in each case calculated as $MoO_3$ or $WO_3$.

The parallel German application "Catalyst and process for preparing polytetrahydrofuran" filed on the same day describes catalysts which can be employed according to the present invention, comprise at least one catalytically active, oxygen-containing molybdenum and/or tungsten compound applied to an oxidic support and have a molybdenum and/or tungsten content, based on the catalyst dried under nitrogen at 400° C., of x$\mu$mol (tungsten and/or molybdenum)/m² of surface area so that $10.1<x<20.9$. Targeted setting of the ratio of the tungsten and/or molybdenum content to the BET surface area enabled the catalyst activity to be significantly increased.

Furthermore, the second German parallel application "Improved catalyst and process for preparing polytetrahydrofuran" filed on the same day describes catalysts which can be employed according to the present invention, comprise at least one catalytically active, oxygen-containing molybdenum and/or tungsten compound on an oxidic support, have been calcined at from 400° C. to 900° C. after application of the precursor compounds of the catalytically active compounds to the support material or a support material precursor and have a porosity such that they have transport pores having a diameter of <25 nm and a volume of these transport pores of at least 50 mm$^3$/g.

The catalysts described in these two parallel applications contain from 0.1 to 70% by weight, preferably from 5 to 40% by weight and particularly preferably from 10 to 35% by weight, of the catalytically active oxygen-containing molybdenum and/or tungsten compound(s), calculated as $MoO_3$ and/or $WO_3$ and based on the total weight of the catalyst.

Suitable oxidic supports for the catalysts comprising the oxygen-containing molybdenum or tungsten compounds or mixtures of such compounds as catalytically active compounds are, for example, zirconium dioxide, titanium dioxide, hafnium oxide, yttrium oxide, iron(III) oxide, aluminum oxide, tin(IV) oxide, silicon dioxide, zinc oxide or mixtures of these oxides. Particular preference is given to zirconium dioxide, titanium dioxide and/or silicon dioxide, very particularly preferably titanium dioxide.

Apart from the abovementioned polymerization catalysts, it is possible to use sheet silicates or zeolites which may, if desired, have been activated by acid treatment as heterogeneous catalyst in the process of the present invention. As sheet silicates, preference is given to using those of the montmorillonitesaponite, kaolinserpentine or palygorskitesepiolite group, particularly preferably montmorillonite, hectorite, kaolin, attapulgite or sepiolite, as described, for example, in Klockmanns Lehrbuch der Mineralogie, 16th edition, F. Euke Verlag 1978, pages 739–765.

The process of the present invention can be carried out using, for example, montmorillonites which are obtainable from Süd-Chemie AG, Munich, under the names Tonsil®, Terrana® or Granosil® or as catalysts of the types Tonsil® K 10, KSF-O, KO or KS. Attapulgites suitable for use in the process of the present invention are sold, for example, by Engelhard Corporation, Iselin, USA, under the trade names Attasorb® RVM and Attasorb® LVM.

The term zeolites refers to a class of aluminum hydrosilicates which, owing to their particular chemical structure have three-dimensional networks with defined pores and channels in the crystal. Natural or synthetic zeolites are suitable for the process of the present invention, with preference being given to zeolites having an $SiO_2$—$Al_2O_3$ molar ratio of from 4:1 to 100:1, particular preference being given to an $SiO_2$—$Al_2O_3$ molar ratio of from 6:1 to 90:1 and very particular preference being given to those having an $SiO_2$—$Al_2O_3$ molar ratio of from 10:1 to 80:1. The primary crystallites of these zeolites preferably have a particle size of up to 0.5 µm, preferably 0.1 µm and particularly preferably 0.05 µm.

The zeolites which can be used in the process of the present invention are used in the H form. In this form, acidic OH groups are present in the zeolite. If the zeolites are not obtained in the H form in their preparation, they can easily be converted into the catalytically active H form by acid treatment with, for example, mineral acids such as hydrochloric acid, sulfuric acid, phosphoric acid, or by thermal treatment of suitable precursor zeolites containing, for example, ammonium ions, for example by heating at from 450 to 600° C., preferably from 500 to 550° C.

The heterogeneous catalysts which can be employed according to the present invention can be used in the process of the present invention in the form of powders, for example when the process is carried out in the suspension mode, or advantageously as shaped bodies, e.g. in the form of cylinders, spheres, rings, spirals or granules, particularly when the catalyst is located in a fixed bed, use as shaped bodies in a fixed bed is preferred.

As monomer, it is possible in principle to use any THF. However, preference is given to using commercial THF which has been prepurified by acid treatment as described, for example, in EP-A 003 112 or by distillation.

Telogens and/or comonomers suitable for use in the process of the present invention are saturated or unsaturated, unbranched or branched alpha, omega-$C_2$–$C_{12}$-diols, water, polytetrahydrofuran having a molecular weight of from 200 to 700 dalton, cyclic ethers and mixtures thereof.

Telogens which are preferably employed for preparing PTHF and THF copolymers are water, ethylene glycol, 1,3-propanediol, 1,4-butanediol, 1,5-pentanediol, 1,6-hexanediol, polytetrahydrofuran having a molecular weight of from 200 to 700 dalton, 1,8-octanediol, 1,10-decanediol, 2-butyne-1,4-diol and neopentyl glycol or mixtures thereof, with particular preference being given to water, 1,4-butanediol and/or polytetrahydrofuran having a molecular weight of from 200 to 700 dalton. Suitable comonomers are cyclic ethers which can be polymerized with opening of the ring, preferably three-membered, four-membered and five-membered rings such as 1,2-alkylene oxides, for example ethylene oxide or propylene oxide, oxetane, substituted oxetanes such as 3,3-dimethyloxetane, and the THF derivatives 2-methyltetrahydrofuran and 3-methyltetrahydrofuran, with particular preference being given to 2-methyltetrahydrofuran or 3-methyltetrahydrofuran.

The telogen is advantageously introduced into the polymerization as a solution in the THF, with preference being given to a telogen content of from 0.04 to 17 mol %, based on tetrahydrofuran. Comonomers are likewise advantageously introduced into the polymerization as solutions in THF, with the comonomer content being able to be up to 30 mol %, preferably 20 mol %, based on tetrahydrofuran. However, the THF and the telogen and/or the comonomer can also be fed separately into the polymerization reactor. Since the telogen effects termination of the polymerization, the mean molecular weight of the PTHF or the THF copolymers can be controlled via the amount of telogen used.

The more telogen present in the reaction mixture, the lower the mean molecular weight of the PTHF or the THF copolymers concerned. Depending on the telogen content of the polymerization mixture, PTHF and THF copolymers having mean molecular weights of from 650 to 5000 dalton, preferably from 650 to 3000 dalton and particularly preferably from 1000 to 3000 dalton, can be prepared.

The polymerization is generally carried out at from 0 to 80° C., preferably from 25 to 75° C. and particularly preferably from 40 to 70° C. The pressure employed is generally not critical to the result of the polymerization, which is why the process is generally carried out at atmospheric pressure or under the autogenous pressure of the polymerization system.

To avoid the formation of ether peroxides, the polymerization is advantageously carried out under an inert gas atmosphere. As inert gases, it is possible to use, for example, nitrogen, carbon dioxide or the noble gases; preference is given to using nitrogen.

The polymerization can also be carried out in the presence of hydrogen at hydrogen pressures of from 0.1 to 10 bar.

The process of the present invention is preferably carried out continuously in all its steps. However, it is also possible for the polymerization step and/or one or more or all of these steps of the process of the present invention to be carried out batchwise, although it is preferred that at least the polymerization is carried out continuously.

The reaction can be carried out in conventional reactors or reactor assemblies suitable for continuous processes in the suspension or fixed-bed mode, for example in loop reactors or stirred reactors in the case of the suspension mode or in tube reactors or fixed-bed reactors in the case of the fixed-bed mode. Preference is given to the fixed-bed mode.

For operation of the continuous polymerization reactor or polymerization reactor assembly, the catalyst can, if desired, be pretreated after it is introduced into the reactor. Suitable pretreatments of the catalyst are, for example, drying with gases heated to 80–200° C., preferably from 100 to 150° C., for example air or nitrogen, or pretreatment with a reducing agent, as described in DE 196 41 481 for the supported catalysts which comprise, as active composition, a catalytically active amount of at least one oxygen-containing molybdenum and/or tungsten compound and are preferred according to the present invention. of course, the catalyst can also be used without pretreatment.

In the preferred fixed-bed mode, the polymerization can be carried out in the upflow mode, i.e. the reaction mixture is conveyed from the bottom upward, or in the downflow mode, i.e. the reaction mixture is passed through the reactor from the top downward. The feed comprising THF and telogen and/or comonomer is fed continously in to the polymerization reactor at a WHSV over the catalyst of from 0.05 to 0.8 kg of THF/(l.h), preferably from 0.1 to 0.6 kg of THF/(l.h) and particularly preferably from 0.15 to 0.5 kg of THF/(l.h).

The polymerization reactor can also be operated using a single pass, i.e. without recirculation of product, or in the circulation mode, i.e. the polymerization mixture leaving the reactor is circulated. In the circulation mode, the ratio of recycle to feed is less than or equal to 100:1, preferably less than 50:1 and particularly preferably less than 40:1.

The concentration of the alpha,omega-diol, waters, polytetrahydrofuran having a mean molecular weight of from 200 to 700 dalton or the mixture thereof in the feed introduced into the polymerization reactor is from 0.02 to 20 mol %, preferably from 0.05 to 15 mol %, particularly preferably from 0.1 to 10 mol %, based on the THF used.

If the polymerization has been carried out in the suspension mode, the major part of the polymerization catalyst has to be separated from the polymerization mixture in the work-up of the output from the polymerization, for example by filtration, decantation or centrifugation, and the resulting polymerization mixture is passed to work-up step a). In the preferred fixed-bed mode, the output from the polymerization is passed directly to the work-up step a).

In work-up step a) of the process of the present invention, the catalyst and/or the downstream products of the catalyst suspended and/or dissolved in the output obtained from the polymerization, which comprises predominantly PTHF and/or THF copolymers, low molecular weight PTHF and/or THF copolymers, water, unreacted diol and/or cyclic ether and THF, are then preferably separated off.

However, it is in principle also possible to carry out the removal of the suspended and/or dissolved catalyst and/or downstream products of the catalyst only after the fractional distillation of the polymerization mixture to give a distillation residue comprising the polymerization product and at least one tetrahydrofuran fraction, i.e. after work-up step b), in which case the catalyst and/or downstream products of the catalyst are preferably separated off after the first distillation step.

Suspended and/or dissolved catalyst and/or downstream products of the catalyst separated off in work-up step a) are, for example, finely divided, suspended or emulsified abraded catalyst comprising unchanged catalyst, the catalyst support and/or the active catalyst component. In the case of supported catalysts comprising an oxidic support material to which oxygen-containing molybdenum or tungsten compounds or mixtures of such compounds have been applied as catalytically active compounds, the abraded material is accordingly unchanged catalyst, support material and/or active oxygen-containing molybdenum or tungsten components. For the purposes of the present invention, downstream products of the catalyst are, for example dissolved cations or anions of the active components, e.g. tungsten or molybdenum cations or molybdate or tungstate anions. In the case of ion exchangers containing sulfonic acid groups, e.g. Nafion®, the downstream products can include fluoride ions and/or sulfonic acids, in the case of the sulfate-doped metal oxides sulfuric acid and/or metal cations or anions.

Although the amount of such catalyst and/or downstream products of the catalyst is small and generally does not exceed 0.1% by weight, usually 0.01% by weight, based on the output from the polymerization, it has been recognized according to the invention that it has to be separated off. This material would otherwise remain in the PTHF after unreacted THF has been separated off and would change the specification data and thus also the properties of the PTHF.

The catalyst and/or downstream products of the catalyst can be separated from the output from the polymerization by filtration, for example ultrafiltration, adsorption on solid adsorbents and/or by means of ion exchangers, with preference being given to filtration and adsorption on solid adsorbents.

The adsorption on the abovementioned solid adsorbents can also be combined with neutralization of the output from the polymerization using acids or bases.

Adsorption is preferably carried out on activated carbon and/or metal oxides and/or ion exchangers at from 25 to 75° C., preferably from 30° C. to 70° C. The removal of catalyst material in work-up step a) is preferably carried out using ion exchangers and/or activated carbon. As metal oxides, preference is given to using sodium hydroxide, aluminum oxide, silicon dioxide, titanium dioxide, zirconium dioxide, lanthanum oxide and/or calcium oxide.

Suitable activated carbon can be obtained, for example, from Merck, Darmstadt, or in the form of the commercial product activated carbon type CPG UF 8×30 from Chemviron Carbon.

Suitable ion exchangers are, for example, anion exchangers such as the commercial product Lewatit® MP 600 which can be obtained from Bayer AG, Leverkusen, mixed ion exchangers such as the commercial product Serdolit® which can be obtained from Serva, Heidelberg, or molecular sieves having pore sizes of from 3 to 10 Å.

The removal of catalyst and/or downstream products of the catalyst according to the present invention by adsorption on solid adsorbents is preferably carried out in a fixed bed at a throughput of generally of from 0.2 to 5 kg/(l*h), in particular from 0.4 to 4 kg/(l*h) (kg of polymerization mixture per l of adsorbent per hour).

The work-up step b) can be carried out either batchwise or continuously, preferably continuously. It serves to separate most or all of the unreacted tetrahydrofuran from PTHF or the THF copolymers by distillation. The separation of the THF in the work-up step b) can in principle be carried out in one distillation step, but is preferably carried out in a plurality of distillation steps, preferably two or three distillation steps, which are advantageously carried out under different pressures.

The configuration of the work-up step b) of the process of the present invention is dependent on the telogen used in the polymerization. Depending on the separation task, possible distillation apparatuses are appropriate columns or evaporators such as falling film evaporators or thin film evaporators. It may also be advantageous to use tray columns.

Possible work-up variants of the step b) when using THF and water as telogen in the polymerization are described in more detail below.

The removal of the major part of the unreacted THF at atmospheric pressure is carried out in a continuously operated distillation column. For this purpose, the catalyst-free polymerization mixture obtained using water as telogen, which usually has a polymer content of from 2 to 25% and a water content of not more than about 300 ppm, is fed into a distillation column via an inlet at the side. At a temperature at the top of from 66 to 67° C. and a temperature at the bottom of from 100 to 200° C., preferably from 120 to 180° C., the major part of the water in admixture with tetrahydrofuran is distilled off via the top. The tetrahydrofuran fraction obtained as distillate is condensed and all or some of it is subsequently returned to the polymerization. The THF/PTHF mixture obtained as distillation residue at the bottom of the column contains, depending on the selected temperature at the bottom, from about 2 to 20% by weight of THF and usually up to about 300 ppm of water, in each case based on the THF/PTHF mixture.

As an alternative, the removal of the major part of the unreacted THF at atmospheric pressure can be carried out in a thin film evaporator, preferably a falling film evaporator with circulation, which is operated at from 100 to 200° C., preferably 120–180° C. The composition of the tetrahydrofuran fraction obtained as distillate and that of the THF/PTHF mixture obtained as distillation residue correspond to those described above.

The distillation residue obtained from the first distillation step is subsequently freed of most of the residual tetrahydrofuran under reduced pressure, preferably in a falling film evaporator, at from 120 to 160° C., in particular at about 130° C., and from 50 to 200 mbar, in particular from 70 to 150 mbar. The THF fraction obtained as distillate, which comprises predominantly THF, can be returned wholly or partly to the polymerization.

When THF and diols are used as telogens in the polymerization, the following work-up variants of the step b) are possible. According to the present invention, it has been recognized that the water content of the output from the polymerization is usually higher than the water content of the feed when using diols as telogens in the polymerization. For this reason, methods of removing water from the system are taken into account in the work-up variants.

The removal of the major part of the unreacted THF at atmospheric pressure and removal of the major part of the water from the system can be carried out in a continuously operated distillation column, preferably a tray column. For this purpose, the catalyst-free polymerization mixture obtained from the work-up step a) using diols as telogens, which usually has a polymer content of from 2 to 25% and a water content of not more than about 500 ppm, is fed into a distillation column via an inlet at the side. At a temperature at the top of from about 66 to 67° C. and a temperature at the bottom of from 100 to 200° C., preferably from 120 to 180° C., the catalyst-free polymerization mixture is fractionated in the column to give a THF/water mixture containing most of the water in a concentration of not more than about 5% as product taken off at the top. A THF fraction which comprises the major part of the THF, is largely free of water and generally contains less than 100 ppm, preferably <50 ppm, of water is obtained at the side offtake and, due to its composition, all or part of this can be returned to the polymerization. At the bottom of the column, a THF/PTHF mixture which, depending on the selected temperature at the bottom, contains from about 2 to 20% by weight of THF and has a water content of not more than about 100 ppm is obtained as distillation residue.

Alternatively, the removal of the major part of the unreacted THF at atmospheric pressure can also be carried out in a thin film evaporator, preferably a falling film evaporator with circulation, which is operated at from 100 to 200° C., preferably from 120–180° C. The catalyst-free polymerization mixture obtained in a) is here separated into a water-containing THF fraction as distillate and a THF/diol/PTHF mixture as distillation residue. The water-containing THF fraction can subsequently be fractionated in a distillation column, preferably at atmospheric pressure and at a temperature at the top of from about 63 to 65° C. and a temperature at the bottom of about 70° C., to give a THF/water mixture having a maximum water content of about 5% as distillate and a largely water-free tetrahydrofuran fraction as distillation residue, which can be taken off from the column at the bottom or the side. This largely water-free THF fraction can be wholly or partly returned to the polymerization.

The THF/diol/PTHF mixture obtained as distillation residue after the respective first distillation step is subsequently freed of most of the residual tetrahydrofuran under reduced pressure, preferably in a falling film evaporator, at from 120 to 160° C., in particular about 130° C., and from 50 to 200 mbar, in particular from 70 to 150 mbar. The THF fraction obtained here as distillate, which comprises predominantly THF and, depending on the vapor pressure of the diols used, can still contain small amounts of diol, can be wholly or partly returned to the polymerization.

Furthermore, it is possible, if desired, for the distillation residue from work-up step b) to be extracted with alkanes, for example pentane, hexane, heptane or octane, as described in EP-A 153 794 to reduce the content of cyclic oligomers before it is passed to work-up step c).

In work-up step c), low molecular weight polytetrahydrofuran or low molecular weight tetrahydrofuran copolymers having a mean molecular weight of from 200 bis 700 dalton are then separated from the distillation residue of work-up step b) in at least one further distillation step at a pressure of from 0.1 to 50 mbar, preferably from 0.1 to 10 mbar, particularly preferably from 0.1 to 5 mbar, and a temperature of from 180 to 280° C., preferably from 200 to 250° C., particularly preferably from 230 to 250° C., and polytetrahydrofuran or tetrahydrofuran copolymers having a mean molecular weight of from 650 to 5000 dalton are isolated. Under the distillation conditions, the diols used as telogens are usually distilled off virtually completely from the desired product. As distillation apparatuses, it is possible to use simple evaporators such as thin film evaporators, falling film evaporators or short-path distillation units.

If desired, part or all of the distillate comprising low molecular weight polytetrahydrofuran and/or tetrahydrofuran copolymer having a mean molecular weight of from 200 to 700 dalton obtained from work-up step c) can be returned to the polymerization.

PTHF and/or the THF copolymers having mean molecular weights of from 650 to 5000 dalton are obtained as distillation residue from work-up step c).

EXAMPLES

The invention is illustrated below with the aid of examples and with reference to a drawing. FIG. 1 (FIG. 1) schematically shows a flow diagram of the process of the present invention.

Molecular Weight Determination

The mean molecular weight ($M_n$) of the PTHF obtained was determined by gel permeation chromatography (GPC) and is defined by the equation $$M_n = \Sigma c_i / \Sigma(c_i/M_i),$$

where $c_i$ is the concentration of the individual polymer species i in the polymer mixture obtained and $M_i$ is the molecular weight of the individual polymer species i.

The polydispersity D as measure of the molecular weight distribution of the polymers prepared as described in the examples was calculated from the ratio of the weight average molecular weight ($M_w$) to the number average molecular weight ($M_n$) using the equation $$D = M_w / M_n$$

$M_w$ and $M_n$ were determined by means of GPC, using a standardized PTHF for calibration. From the chromatograms obtained, the number average $M_n$ was calculated using the equation $$M_n = \Sigma c_i / \Sigma(c_i/M_i)$$

and the weight average $M_w$ was calculated using the equation $$M_w = (\Sigma(c_i * M_i))/\Sigma ci$$

where $c_i$ is the concentration of the individual polymer species i in the polymer mixture obtained and $M_i$ is the molecular weight of the individual polymer species i.

Determination of the Color Number

The determination of the color number is described in the standards DIN 53409 and ASTM-D-1209.

Example 1

Preparation of the Catalyst

The catalyst was prepared by adding 124.7 kg of titanium dioxide (water content: 23.3% by weight), 25.5 kg of tungstic acid ($H_2WO_4$) and 6.0 kg of tartaric acid to a solution of 146 kg of 87% strength of phosphoric acid ($H_3PO_4$) in 45.5 kg of water. This mixture was mixed in a pan mill for 0.5 hour, extruded to form 4.5 mm diameter extrudates and dried at 120° C. for 2 hours. The catalyst was subsequently calcined at 690° C. for 3 hours. The catalyst had a tungsten content, calculated as tungsten trioxide, of 20% by weight based on the total weight of the catalyst.

Examples 2 to 4

Continuous Single-stage Preparation of PTHF 1800, PTHF 2000 and PTHF 2900

Examples 2, 3 and 4 were carried out according to the flow diagram shown in FIG. 1. All process steps were carried out using $N_2$ as protective gas.

Example 2

7 kg/h of 1,4-butanediol-containing THF (feed) were passed continuously at 60° C. over 28 kg of the $WO_3/TiO_2$ catalyst prepared as described in Example 1 which was located as a fixed bed in a 30 l tube reactor. The feed contained 0.36% by weight of 1,4-butanediol, corresponding to a 1,4-butanediol feed rate of 25 g/h, and about 40 ppm of water. The reactor was operated in the upflow mode with circulation at a recycle/feed ratio of 100:1.

The reaction mixture from the polymerization reactor was passed at 60° C. and a WHSV of 2.8 kg of feed/(l*h) over activated carbon (Chemviron Carbon; type CPG UF 8×30) located as a fixed bed in a 2.5 l vessel. The mixture which had been treated with activated carbon was subsequently fed into a distillation column having 32 theoretical plates via a side inlet. At a temperature at the bottom of 115° C. and a pressure of 1100 mbar, 0.08 kg/h of a THF/water mixture having a water content of about 2% by weight was taken off at the top of the column. 6.5 kg/h of a THF fraction having a water content of 40 ppm were taken off at the side offtake of the column and were recirculated to the polymerization step. 0.42 kg of product was taken off at the bottom of the column and subsequently passed to a falling film evaporator. At 140° C. and 100 mbar, 0.04 kg/h of residual THF was distilled off. To separate off low molecular weight PTHF, 0.38 kg/h of bottoms from the vacuum distillation were fed to a short-path distillation apparatus in which 0.04 kg/h of low molecular weight PTHF having a molar mass of 250 was distilled off at 230° C. and 1 mbar. 0.34 kg/h of PTHF having a mean molecular weight $M_n$ of 2050 and a polydispersity D of 2.0 was obtained and a color number of 3 APHA. The space-time yield was 11.3 g of PTHF 2050/(l*h). The THF conversion was 4.9%.

Example 3

The reaction conditions of Example 2 were maintained, but the amount of butanediol introduced into the polymerization was reduced from 25 g/h to 21.9 g/h. After work-up of the polymerization mixture as described in Example 2, PTHF having a mean molecular weight $M_n$ 2900, a polydispersity D of 2.3 and a color number of 5 APHA was obtained. The space-time yield was 18.6 g of PTHF 2900/(l*h), and the THF conversion was 7.8%.

Example 4

The reaction conditions of Example 2 were maintained, but the amount of butanediol recirculated was increased to 27 g/h. After work-up of the polymerization mixture as described in Example 2, PTHF having a mean molecular weight $M_n$ 1810, a polydispersity D of 1.9 and a color number of 6 APHA was obtained. The space-time yield was 10.3 g of PTHF 1810/(l*h), and the THF conversion was 4.0%.

We claim:

1. A process for the single-stage preparation of polytetrahydrofuran and/or tetrahydrofuran copolymers having a mean molecular weight of from 650 to 5000 dalton by polymerization of tetrahydrofuran over a heterogeneous acid catalyst in the presence of at least one telogen and/or comonomer selected from the group consisting of alpha, omega-diols, water, polytetrahydrofuran having a molecular weight of from 200 to 700 dalton and cyclic ethers, which comprises a) separating off the catalyst and/or downstream products of the catalyst suspended and/or dissolved in the output from the polymerization by adsorption on solid adsorbents and/or by means of ion exchangers, b) fractionating the resulting catalyst-free output from the polymerization in at least one distillation step to give a distillation residue comprising the polymerization product and at least one tetrahydrofuran fraction and returning at least part of the tetrahydrofuran fraction to the polymerization and c) separating low molecular weight polytetrahydrofuran and/or tetrahydrofuran copolymers having a mean molecular weight of from 200 to 700 dalton from the distillation residue from work-up step b) and isolating polytetrahydrofuran and/or tetrahydrofuran copolymers having a mean molecular weight of from 650 to 5000 dalton.

2. A process as claimed in claim 1, wherein, in work-up step a), the adsorption is carried out on activated carbon and/or metal oxides and/or ion exchangers at from 25 to 75° C.

3. A process as claimed in claim 1, wherein, in work-up step a), adsorption is carried out on sodium hydroxide, aluminum oxide, silicon dioxide, titanium dioxide, zirconium dioxide, lanthanum oxide and/or calcium oxide.

4. A process as claimed in claim 1, wherein the fractionation of the polymerization product in work-up step b) is carried out in two distillation steps.

5. A process as claimed in claim 1, wherein the distillation residue comprising the polymerization product from work-up step b) is extracted with alkanes before being passed to work-up step c).

6. A process as claimed in claim 1, wherein the low molecular weight polytetrahydrofuran and/or tetrahydrofuran copolymers having a mean molecular weight of from 200 to 700 dalton which are separated off in work-up step c) are returned at least partly to the polymerization.

7. A process as claimed in claim 1, wherein all the steps are carried out continuously.

* * * * *